US010719128B2

(12) United States Patent
Jeitner et al.

(10) Patent No.: US 10,719,128 B2
(45) Date of Patent: Jul. 21, 2020

(54) OPERATOR CONTROL ELEMENT WITH HAPTIC FEEDBACK WHICH IS DEPENDENT ON THE DETECTION DIRECTION

(71) Applicant: PREH GMBH, Bad Neustadt a. d. Saale (DE)

(72) Inventors: Martin Jeitner, Ostheim (DE); Markus Klein, Salz (DE); Andreas Kramlich, Bad Neustadt a. d. Saale (DE); Matthias Lust, Dittelbrunn (DE); Benedikt Schmidt, Fladungen (DE)

(73) Assignee: PREH GMBH, Bad Neustadt A. D. Saale (DE)

( * ) Notice: Subject to any disclaimer, the term of this patent is extended or adjusted under 35 U.S.C. 154(b) by 41 days.

(21) Appl. No.: 15/556,249

(22) PCT Filed: Mar. 8, 2016

(86) PCT No.: PCT/EP2016/054895
§ 371 (c)(1),
(2) Date: Sep. 6, 2017

(87) PCT Pub. No.: WO2016/142373
PCT Pub. Date: Sep. 15, 2016

(65) Prior Publication Data
US 2018/0246571 A1    Aug. 30, 2018

Related U.S. Application Data

(60) Provisional application No. PCT/EP2016/054895, filed on Mar. 8, 2016.

(30) Foreign Application Priority Data

Mar. 9, 2015   (DE) ........................ 10 2015 103 407

(51) Int. Cl.
*G06F 3/041*         (2006.01)
*G06F 3/01*          (2006.01)
(Continued)

(52) U.S. Cl.
CPC ............. *G06F 3/016* (2013.01); *G05G 9/047* (2013.01); *G06F 3/0338* (2013.01); *G06F 3/0383* (2013.01)

(58) Field of Classification Search
None
See application file for complete search history.

(56) References Cited

U.S. PATENT DOCUMENTS 5,959,613 A    9/1999 Rosenberg et al.
2004/0095369 A1   5/2004 Takeuchi et al.
(Continued)

FOREIGN PATENT DOCUMENTS

EP    2395414 A1    12/2011

OTHER PUBLICATIONS

Algorithmus, Wikipedia Definition, Version dated Mar. 5, 2015, URL: https://de.wikipedia.org/w/index.php?title=Algorithmus&oldid=139476670.
(Continued)

*Primary Examiner* — Carl Adams
(74) *Attorney, Agent, or Firm* — M&B IP Analysts, LLC

(57) ABSTRACT

A device and method for an operator controlled element with haptic feedback dependent on the detection direction are provided. The device includes a base; an actuating part movably supported on the base; an electrical actuator which is attached to the base and acts on the actuating part in order to drive in a moving manner the actuating part in an excitation direction by means of an electrical excitation signal for generating a haptic feedback; a means for detecting an actuation of the actuating part in two detection
(Continued)

directions which in each case include a different angular amount with the excitation direction; an evaluation unit, which is configured, if an actuation in one of the two detection directions is detected, to drive the actuator with a specific electrical excitation signal, depending on the result relating to in which of the two detection directions the actuation was carried out.

18 Claims, 5 Drawing Sheets

(51) Int. Cl.
*G05G 9/047* (2006.01)
*G06F 3/0338* (2013.01)
*G06F 3/038* (2013.01)

(56) References Cited

U.S. PATENT DOCUMENTS

| | | |
|---|---|---|
| 2004/0135770 A1 | 7/2004 | Hayasaka |
| 2005/0134562 A1* | 6/2005 | Grant .................. G06F 3/016 345/161 |
| 2006/0028441 A1 | 2/2006 | Armstrong |
| 2009/0076676 A1 | 3/2009 | Yamamoto et al. |
| 2011/0043447 A1 | 2/2011 | Inaba et al. |
| 2011/0193802 A1* | 8/2011 | Park ............... G02F 1/133615 345/173 |
| 2013/0033366 A1 | 2/2013 | McDonough et al. |
| 2014/0320431 A1* | 10/2014 | Cruz-Hernandez ..... G06F 3/016 345/173 |
| 2014/0340372 A1 | 11/2014 | Olsson et al. |
| 2016/0179128 A1* | 6/2016 | Guglielmo .............. B66F 11/04 182/19 |
| 2016/0259411 A1* | 9/2016 | Yoneoka ................. G06F 3/016 |

OTHER PUBLICATIONS

Arbitrvärgenerator, Wikipedia Definition, Version dated Nov. 7, 2013, URL: https://de.wikipedia.org/w/index.php?title=Arbitr%C3%A4rgenerator&oldid=124225071.

Linearmotor, Wikipedia Definition, Version dated Dec. 5, 2014, URL: https://de.wikipedia.org/w/indexphp?title=Linearmotor&oldid=136489865.

Lookup-Tabelle, Wikipedia Definition, Version dated Sep. 18, 2014, URL: https://de.wikipedia.org/w/index.php?title=Lookup-Tabelle&oldid=134157105.

Tastgrad, Wikipedia Definition, Version dated Feb. 6, 2015, URL: https://de.wikipedia.org/w/index.php?title=Tastgrad&oldid=138542998.

The First Chinese Office Action for Chinese Patent Application No. 2016800144382, dated Sep. 3, 2019, CNIPA, China.

The International Search Report and the Written Opinion from the International Searching Authority for PCT/EP2016/054895, dated May 13, 2016, ISA/EPO, Rijswijk, The Netherlands.

* cited by examiner

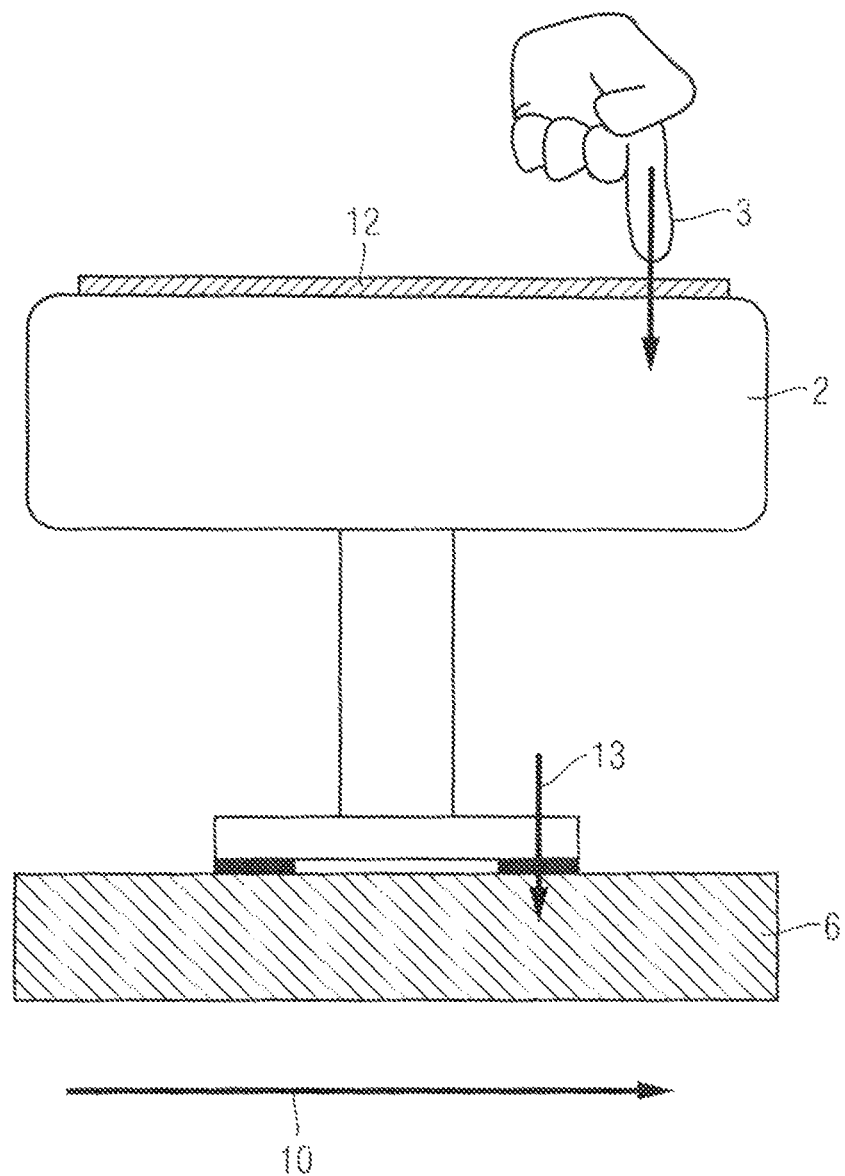

OPERATOR CONTROL ELEMENT WITH HAPTIC FEEDBACK WHICH IS DEPENDENT ON THE DETECTION DIRECTION

CROSS-REFERENCE TO RELATED APPLICATIONS

This application claims priority under 35 U.S.C. § 371 to the International Application No. PCT/EP2016/054895, filed Mar. 8, 2016, and to the German Application No. 102015103407.7, filed Mar. 9, 2015, the contents of which are hereby incorporated by reference.

BACKGROUND

The present disclosure relates to an operating member with an actuating part, which further comprises an actuator acting on the actuating part for generating a haptic feedback. The actuator is configured to cause an excitation of movement substantially in one excitation direction and, for example, a purely translational movement of the actuating part. In the case of such operating members with actuating and detection directions that are differently orientated with regard to the excitation direction and with different actuating surfaces that may be the result thereof, there is the problem that the haptic feedback to be transmitted to the hand or finger of the operator either does not vary, or varies to an undesirably great extent, with the respective detection direction, depending on the mechanical design of the mounting of the actuating part on the base and/or due to the shape of the actuating part, but also due to the effect of the actuation on the actuator.

SUMMARY

Having discovered this disadvantage, the inventors set themselves the task of developing an operating member with several detection directions that are differently oriented with regard to the excitation direction of the haptic feedback in such a way that the haptic feedback acting on the actuating surface, which is thus perceived at the hand or finger of the operator in the case of different actuations, can be adapted, i.e. harmonized, with respect to the several detection directions by variation, i.e. can thus be perceived to correspond at least approximately. This object is achieved with an operating member according to claim 1. An equally advantageous use is the subject matter of the use claim. An equally advantageous method for the generation of haptics is the subject matter of the independent method claim. Advantageous embodiments of the operating member are in each case the subject matter of the dependent claims. It must be noted that the features cited individually in the claims can be combined with each other in any technologically meaningful manner and represent other embodiments of the present disclosure. The description, in particular in connection with the Figure, additionally characterizes and specifies the present disclosure.

The current embodiment relates to an operating member having a base. If used in a motor vehicle, the base is firmly connected to, for example, the vehicle, e.g. to a dashboard or a console. For example, the base consists entirely or partially of a thermoplastic or a zinc die casting alloy. According to an embodiment, an actuating part movably supported on the base is provided. According to an embodiment, an electrical actuator which is attached to the base and acts on the actuating part is also provided, in order to drive in a moving manner the actuating part in an excitation direction by means of an electrical excitation signal for generating a haptic feedback. For example, the actuator is an electromotive actuator.

According to an embodiment, means for detecting an actuation of the actuating part in at least two detection directions are also provided, wherein the detection directions resolvable by these means in each case include a different angular amount, e.g. 0°, 45°, 90° or 180°, with the excitation direction. In the sense of the an embodiment, the excitation direction is substantially determined by the operative direction of the actuator, in particular the direction in which a movement of the actuating part is initiated from a rest position of the actuating part.

The term actuation used herein is to the construed broadly. The crucial point is not a movement of the actuating part; rather, the action of an actuating force on an actuating part is sufficient. Thus, according to the current embodiment, those actuations are included in which the actuating part, due to its degrees of freedom in movement, undergoes a movement upon actuation in a detection direction corresponding to the degrees of freedom, but also those in which a contact takes place with surface that is touch-sensitive due to the associated detection means and in which a movement of the actuating part or parts thereof does not necessarily occur. In other words, the term actuation is not supposed to necessarily imply a movement of the actuating part caused by the actuation.

Accordingly, the term detection direction is to be construed broadly. Thus, the detection direction according to an embodiment does not necessarily result from the direction of the movement caused by the actuation but, in the end, is defined by the means for detecting and their resolution, i.e. by the detectable ones of all possible actuation directions. For example, embodiments are conceivable in which the acting actuating force is deflected and the different detection directions are resolved by the different locations of action of the deflected actuating force on a touch-sensitive surface. For example, a movement caused by actuation may possibly fall into a predetermined angular range only after a predetermined minimum movement (tolerance) is exceeded, in order to be detected as an actuation in one of the detection directions.

In one embodiment, the detection direction or the parallels thereof lie in the same plane as the excitation direction. Preferably, at least one of the at least two detection directions lies outside a plane spanned by the excitation direction and the respective other detection direction. According to another preferred embodiment, the provided detection directions are either parallel or orthogonal to the excitation direction.

Since the actuation does not necessarily imply a movement of the actuating part, the means for detecting an actuation of the actuating part, according to one variation, are configured in such a way that they carry out a touch detection on a touch surface orthogonal to the detection direction and/or a movement detection in a direction parallel to the detection direction.

According to another variation, the actuation is detected by means of a movement of the actuating part. For example, movement detection is carried out by means that detect the deflection caused by the actuation in an optical, magnetic, capacitive, inductive or acoustic manner, or a force sensor is provided. Preferably, a capacitive force sensor is provided to detect the movement. For example, detection is carried out by comparing the measured result with a predetermined threshold value.

According to an embodiment, an evaluation unit is also provided, which is configured, if an actuation in one of the two detection directions is detected, to drive the actuator with a specific electrical excitation signal, depending on the result relating to in which of the two detection directions the actuation was carried out. In the sense of an embodiment, specific means that the electrical excitation signals differ if either only the one or only the other detection direction was detected. The specific electrical excitation signals, or their specific characteristic values, are pre-stored in a look-up table or calculated by means of an algorithm as required.

Thus, the electrical excitation signal for controlling the actuator is varied in a detection direction-dependent manner. By means of this individualization of the haptic feedback, the operator can be provided with a more specific feedback in a simple case because the latter relates to the specific detection direction, and the operator, via the feedback, not only obtains the information that an actuation has taken place, but also a specified information about into which of the at least two detection directions an actuation has taken place. Preferably, the specific, also referred to as detection direction-specific, electrical excitation signals are selected in such a way that the haptic feedback adapts with respect to perception. By empirical determination or mathematical modelling, e.g. model analysis, for example, the system response of the actuating part or of the operating member is determined and a high degree of conformity as regards the different detection directions is achieved by means of a suitable selection of the output signal, e.g. its course in time, such as its behavior when rising or falling.

According to a preferred embodiment, the evaluation unit is configured to generate another specific excitation signal and drive the actuator with it, in the case that two detection directions were detected simultaneously. This yields three specific electrical excitation signals that are distinguishable in at least one characteristic value. For example, this may be generated by averaging the two above-mentioned specific electrical excitation signals.

According to another variation, it is provided that the associated means for detection differ in construction with regard to at least two detection directions. For example, a resistive or capacitive sensor system is responsible for the touch detection in one detection direction, whereas the actuation along the remaining detection directions is detected by a capacitive force sensor system or a contactlessly functioning, e.g. magnetic or optical, motion sensor system. In addition, the preferred combination of a touch detection with other types of detection is advantageous in that by means of the detection, for example in the case of a simultaneous actuation in two actuating directions, including the touch detection, the manner can be detected in which the operator grasps the actuating part with his hand or touches it with his finger, in order to vary the haptic feedback in accordance therewith.

Preferably, the actuator is an actuator driving the actuating part in a linear manner, e.g. a piezo-electric actuator. More preferably, it is an electrodynamic, e.g. electromotive, or an electromagnetic actuator. For there is a problem in the case of the linearly functioning actuators in general, but particularly in the case of an electrodynamic or electromagnetic actuator, that as a rule, a relative shift between the actuating part and the base that corresponds to the actuation is caused upon actuation, and that, depending on the direction of this relative shift, the latter may affect the motive power because due to it, for example, the relative orientation, possibly the restoring forces of a possibly elastically restoring mounting acting on the actuating part, but primarily the magnetic interaction of the cooperating components of the actuator and, in the end, the operating point of the actuator, is changed prior to and during the generation of the haptic feedback.

According to a preferred embodiment of the operating member, it is therefore provided that the specific electrical excitation signal is selected by the evaluation unit to compensate at least partially an operating point shift of the actuator caused by the actuation of the actuating part.

It was found that electrodynamic and electromagnetic actuators, in particular, respond sensitively to a deflection from the rest position and that here, there is an increased need for adjustment with regard to the electrical excitation signal in order to "harmonize" the haptic feedback in the case of the differing actuating directions.

According to a preferred embodiment, the electrical excitation signal is in each case a pulse signal or pulse sequence signal; for example, it is a Gaussian pulse or triangular pulse or a sequence thereof.

Preferably, it is provided that the electrical excitation signal provided for controlling the actuator comprises a rectangular acceleration pulse and the specific electrical excitation signals vary solely with respect to the duty factor of the rectangular acceleration pulse. Within the sense of an embodiment, rectangular acceleration pulse means that the electrical excitation signal for controlling the actuator has a first pulse or rectangular pulse initiating the movement of the actuating part from its rest position. It was found that there is a simple option, by varying the duty factor, to generate a sensory impression for the operator that is haptically indistinguishable despite different detection directions. Rectangular pulses are generated by means of pulse width modulation; the associated methods are known to the person skilled in the art and are not the subject matter of the present disclosure. More preferably, the detection direction-specific electrical excitation signals differ solely with respect to the maximum amplitude.

Preferably, the maximum amplitude varies depending on the angular amount that the detection direction includes with the excitation direction. For example, solely the maximum amplitude decreases or increases as the angular amount increases.

According to a preferred embodiment the excitation signal is a sequence consisting solely of an acceleration pulse and a braking pulse. For all specific electrical excitation signals, preferably both the acceleration pulse and the braking pulse have matching directions. Preferably, the time lag between the acceleration pulse and the braking pulse is identical for all specific electrical excitation signals.

Within the sense of the current embodiment, the term acceleration pulse means that the excitation signal comprises a first pulse initiating the movement of the actuating part from its rest position, whereas the braking pulse is defined by having a braking effect on the initiating movement, wherein the initiating movement may be a movement in exclusively one direction of a sequence of a movement back and forth. For example, the braking pulse is a Gaussian pulse, a triangular pulse or a rectangular pulse. Depending on the configuration of the actuator, the braking pulse may have the same or an opposite polarity to the acceleration pulse.

According to one embodiment, the mounting of the actuating part on the base is configured so as to result in an independently elastic, possibly mechanically damped restoring action into a rest position of the actuating part. In the resulting oscillating system, the braking pulse preferably occurs with a time lag after the acceleration pulse. It is preferably provided that the specific electrical excitation signals do not differ in the time lag between the acceleration pulse and the braking pulse. For example, the braking pulse occurs in such a way that overshooting of the oscillating system is reduced or even avoided.

Preferably, the actuating part is a three-dimensional raised portion whose flanks define the actuating surfaces, among other things. For example, the actuating part is a rotary knob in which a first switching functionality is realized by means of a rotary position detection about one rotary axis, and in which an additional switching functionality is provided by an additional movability of the actuating part parallel to the rotary axis or a touch detection on an end face of the rotary knob facing towards the operator. The excitation by an actuator generating a haptic feedback occurs, for example, in a direction perpendicular to the rotary axis.

Preferably, the operating member is a joystick with a pivotable or shiftable mounting of the actuating part.

Furthermore, the present disclosure relates to the use of the operating member in one of the above described embodiments in a motor vehicle.

An embodiment further relates to a method for the generation of haptics in an operating member, the method comprising the following steps. In a providing step, there is provided: a base, an actuating part movably mounted on the base, an electrical actuator in order to drive in a moving manner the actuating part in an excitation direction by means of an electrical excitation signal for generating a haptic feedback, and means for detecting an actuation of the actuating part in at least two detection directions, which in each case include a different angular amount with the excitation direction. In a detection step according to an embodiment, a detection of an actuation in one of the at least two detection directions takes place.

In a subsequent step, a specific electrical excitation signal for the actuator is generated if an actuation in one of the two detection directions was detected, wherein the excitation signal varies depending on the result relating to in which of the two detection directions the actuation was carried out.

In a step which is simultaneous with or subsequent to the previously described step, the actuator is excited with the specific electrical excitation signal if an actuation in one of the two detection directions was detected.

Thus, the electrical excitation signal of the actuator is varied in a detection direction-dependent manner. By means of this individualization of the haptic feedback, the operator can be provided with a more specific feedback in a simple case because the latter relates to the specific detection direction, and the operator, via the feedback, not only obtains the information that an actuation has taken place, but also a specified information about into which of the at least two detection directions an actuation has taken place. Preferably, the detection direction-specific electrical excitation signals are selected in such a way that the haptic feedback adapts with respect to perception. By empirical determination or mathematical modelling, e.g. modal analysis, for example, the system response of the actuating part or of the operating member is determined and a high degree of conformity as regards the different detection directions is achieved by means of a suitable selection of the output signal, e.g. its course in time, such as its behavior when rising or falling.

In a preferred embodiment of the method, the actuator is configured to drive the actuating part solely linearly. More preferably, it is an electrodynamic, e.g. electromotive, or an electromagnetic actuator. For there is a problem in the case of the linearly functioning actuators in general, but particularly in the case of an electrodynamic or electromagnetic actuator, that as a rule, a relative shift between the actuating part and the base that corresponds to the actuation is caused upon actuation, and that, depending on the direction of this relative shift, the latter may affect the motive power because due to it, for example, the relative orientation, and thus the magnetic interaction of the cooperating components of the actuator and, in the end, the operating point of the actuator is changed, prior to and during the generation of the haptic feedback.

According to a preferred variation of the method according to an embodiment, the specific electrical excitation signal is selected to compensate an operating point shift of the actuator caused by the actuation of the actuating part. It was found that all actuators, but particularly electrodynamic and electromagnetic actuators, respond sensitively to a deflection from their rest position, which is obtained after the actuation and prior to the electrical controlling process, because this causes an operating point shift and thus affects the generated haptic feedback. There is thus an increased need for adjustment to adjust the electrical excitation signal correspondingly after actuation has taken place, with the aim of "harmonizing" the haptic feedback in the case of the differing actuating directions.

According to a preferred variation of the method, the electrical excitation signal is in each case a pulse signal or pulse sequence signal.

According to another embodiment of the method according to an embodiment, a touch on the actuating part is detected by means of means for touch detection, in order to vary the specific electrical excitation signal depending on the result of the touch detection. Thus, the generation of haptics is varied depending on the touch situation provided on the actuating part due to the type of touch by the hand or finger of the operator. For example, an actuating touch by a finger of the operator is assumed to be provided, due to a positive detection on a touch-sensitive surface, and the generation of haptics is varied by means of a specific electrical excitation signal.

According to a preferred embodiment of the method according to an embodiment, the determining step is configured to generate another specific excitation signal and drive the actuator with it, in the case that two detection directions were detected simultaneously. "Simultaneously" is not to be interpreted narrowly and also means the case of an actuation falling within a common evaluation interval, without absolute synchronicity. This yields, for example, at least three specific electrical excitation signals that are distinguishable in at least one characteristic value. For example, an electrical characteristic value, such as the maximum amplitude of the specific electrical excitation signal is determined by the absolute ratio of the detection result in the detection directions concerned.

It is preferably provided that the electrical excitation signal in each case comprises a rectangular acceleration pulse and the specific electrical excitation signals vary solely with respect to the duty factor, more preferably solely with respect to the maximum amplitude of the rectangular acceleration pulse.

Preferably, the excitation signal is a sequence consisting solely of an acceleration pulse and a braking pulse.

BRIEF DESCRIPTION OF THE DRAWINGS

The present disclosure is explained further with reference to the following figures.

The Figures are to be understood only as examples and merely represent a preferred embodiment. In the figures:

FIGS. 3 and 4 show a second embodiment of the operating member;

DETAILED DESCRIPTION

Figure 1:
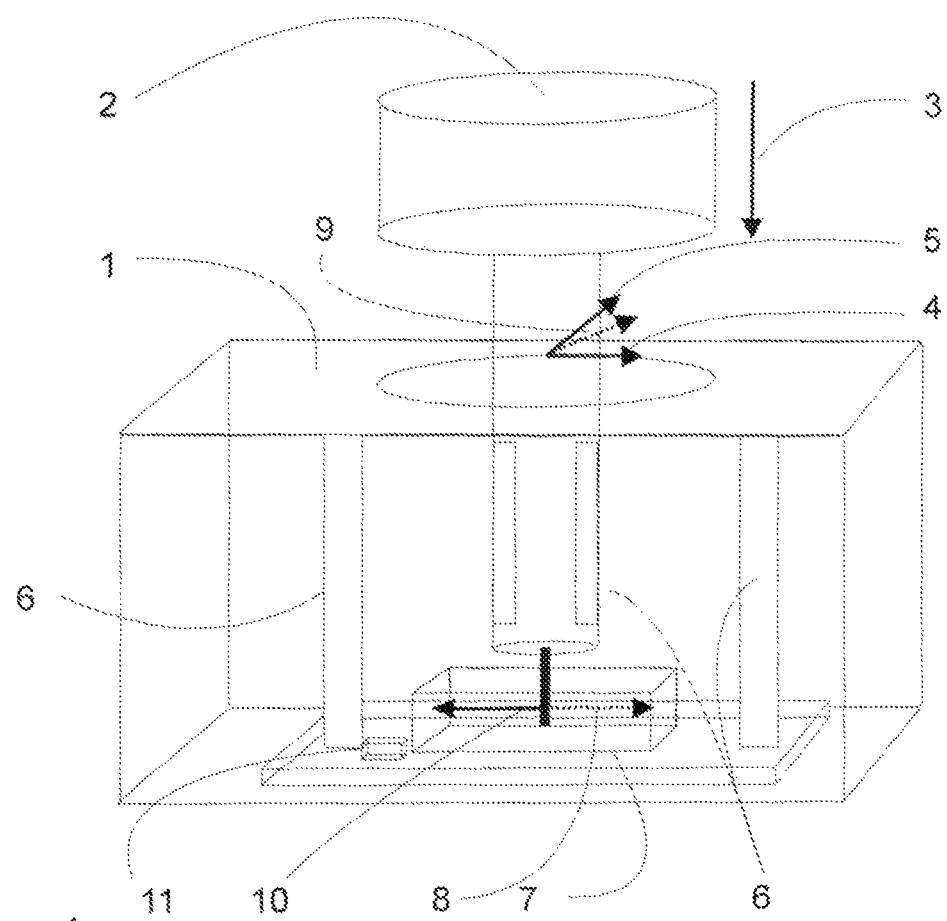
FIG. 1 shows a schematic illustration of an embodiment of the operating member according to an embodiment, FIGS. 2a and 2b each show a schematic, in each case superposed, time-dependent illustration of detection direction-specific electrical excitation signals having an acceleration pulse and a braking pulse, including an associated path-time diagram of the actuating part.

The actuating part 2 movably mounted on the base 1 can be moved, for example, in a plane spanned by the arrows 4 and 5 and perpendicularly to this plane in a direction 3. The mounting of the actuating part 2 on the base 1, which not shown in more detail, is configured so as to result in an independently elastic, possibly mechanically damped restoring action into the rest position of the actuating part 2 shown in FIG. 1. Furthermore, means for detecting 6 are provided which detect the movement of the actuating part 2 from the rest position. The detection of movement is carried out, for example, by means of at least one optical or at least one magnetic sensor or by means of at least one force sensor or by means of combinations thereof. The drawn-in detection directions 3, 4 and 5 are those detection directions that are detected by the means for detecting 6 in a resolving manner, among other things. Thus, the detection of movement takes place along three detection directions 3, 4 and 5, and the associated detection result is evaluated in the evaluation unit 11. Drawing upon a look-up table or using a mathematical algorithm, the evaluation unit 11 outputs a specific electrical excitation signal to an actuator 7. The actuator 7 is driven by means of this electrical excitation signal. Corresponding to the specific electrical excitation signal, the electromagnetically linearly driving actuator 7 generates a haptic feedback in a linear manner along the detection direction 10 by the actuator 7, acting on the actuating part 2, driving the latter from the rest position. As FIG. 2 shows, the excitation direction 10 is parallel to the plane spanned by the detection directions 4 and 5. As can be seen in FIG. 1, the detection directions 3, 4 and 5 defined by the means for detecting 6, with regard to the amount, each include a different angle with the excitation direction 10. The excitation direction 10, which is the same for all specific electrical excitation signals, is in this case defined by an acceleration pulse in which the actuating part 2 is driven from its rest position, generating a haptic feedback, wherein the direction of the dashed arrow 8 is supposed to illustrate the direction of action of a braking pulse which is associated with all specific electrical excitation signals and is subsequent to the acceleration pulse.

Figure 2A:
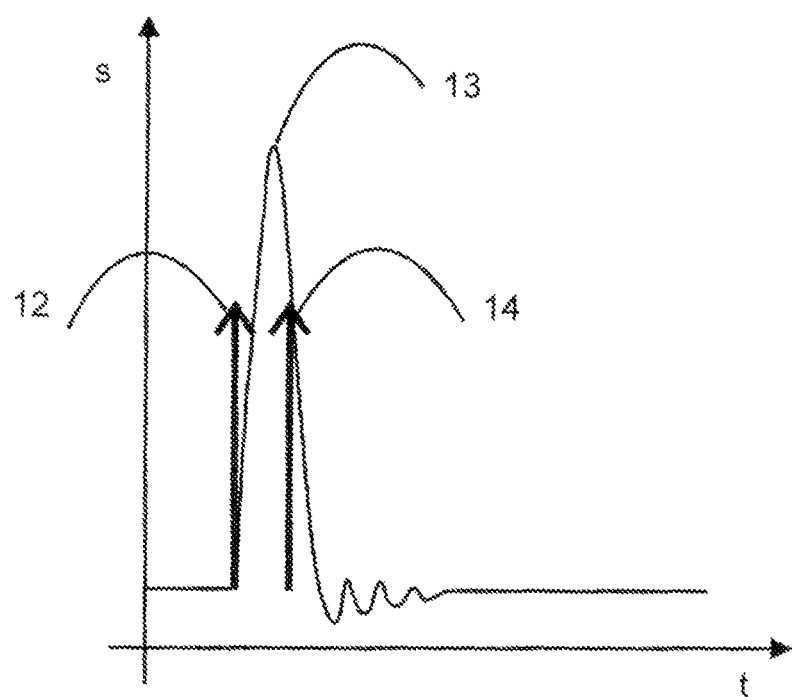
Figure 2B:
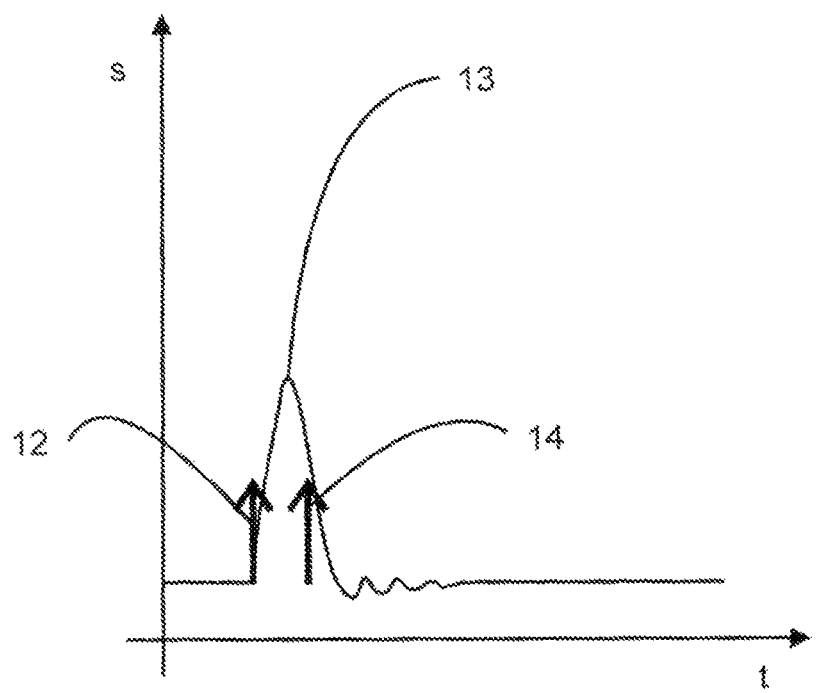

As shown in the FIGS. 2a and 2b, the specific electrical excitation signal has a first acceleration pulse 12 in the excitation direction 10 initiating the movement of the actuating part from its rest position and a second subsequent braking pulse 14 opposite to the initiating movement. In a time-superposed illustration, the path-time curve of the freely movable actuating part, which is only driven by the actuator, is shown in order to illustrate the system response of the actuating part to the excitation signal. It becomes clear that the braking pulse 14 occurs after achieving the maximum deflection. The FIGS. 2a and 2b differ only in the amplitude of the acceleration pulse 12 and the braking pulse 14 and thus in the path-time representation of the sequence of movements carried out by the actuating part, which substantially varies with respect to the maximum amplitude 13 of the deflection of the actuator 7. The excitation signal shown in FIG. 2a and the associated movement diagram correspond to that, for example, which is generated during a movement of the actuating part in the direction of the arrow 4 from FIG. 1, whereas the sequences shown in FIG. 2b correspond to a detection of an actuation in the direction of the arrow 3. Due to the detection direction-dependent variation of the maximum amplitude, the operator obtains a haptic feedback indistinguishable for sensory perception.

Figure 3:
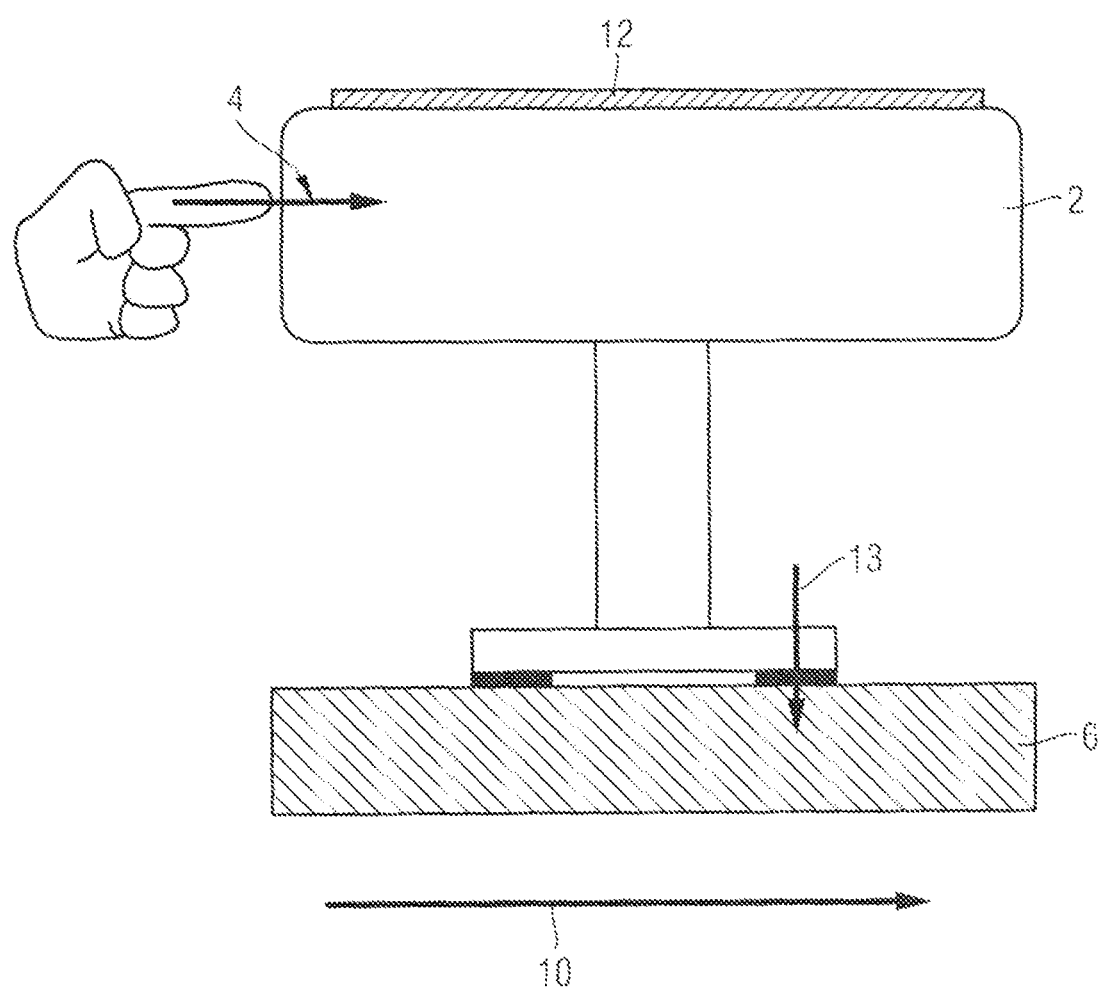

In a schematic representation, FIG. 3 shows another, second embodiment of the operating member according to an embodiment. The actuating part 2 acts on a touch-sensitive input surface of a spatially resolving touchpad or touchscreen 6 as a means for detecting. The possible detection directions can be determined by means of the spatially resolving determination of the location of action of the actuating part 2 on the touchpad or touchscreen 6. For example, due to the action at the location 13, the detection direction indicated with the arrow 4 is detectable and distinguishable from an opposite actuation (which is not shown) by means of an action on an opposite side of the actuating part 2. With the detection of such an actuation, a haptic feedback in the direction of the arrow 10 is triggered, which acts in a linear direction parallel to the touchpad or touchscreen 6 on the touchpad or touchscreen 6 by an actuator that is not shown.

Because, as shown in FIG. 4, an actuation in the direction 3 of the actuating part 2 on the top side of the actuating part 2 would not be distinguishable by the touchpad or touchscreen 6 from an actuation according to the FIG. 3, but since a different haptic feedback and thus a different excitation signal for the actuator is desired for such an actuation, due to the different finger position, the means for detecting are supplemented in the present embodiment with means for detecting movement 12 on the top side of the actuating part 2. It is thus possible to improve the resolution of the means for detection 6 in such a way that another detection direction 3 can be resolved, and an actuation in this detection direction 3 can be associated with a haptic feedback or a specific electrical excitation signal that differs from the one that would be associated with an actuation in the detection direction according to arrow 4 from FIG. 3.

Figure 5A:
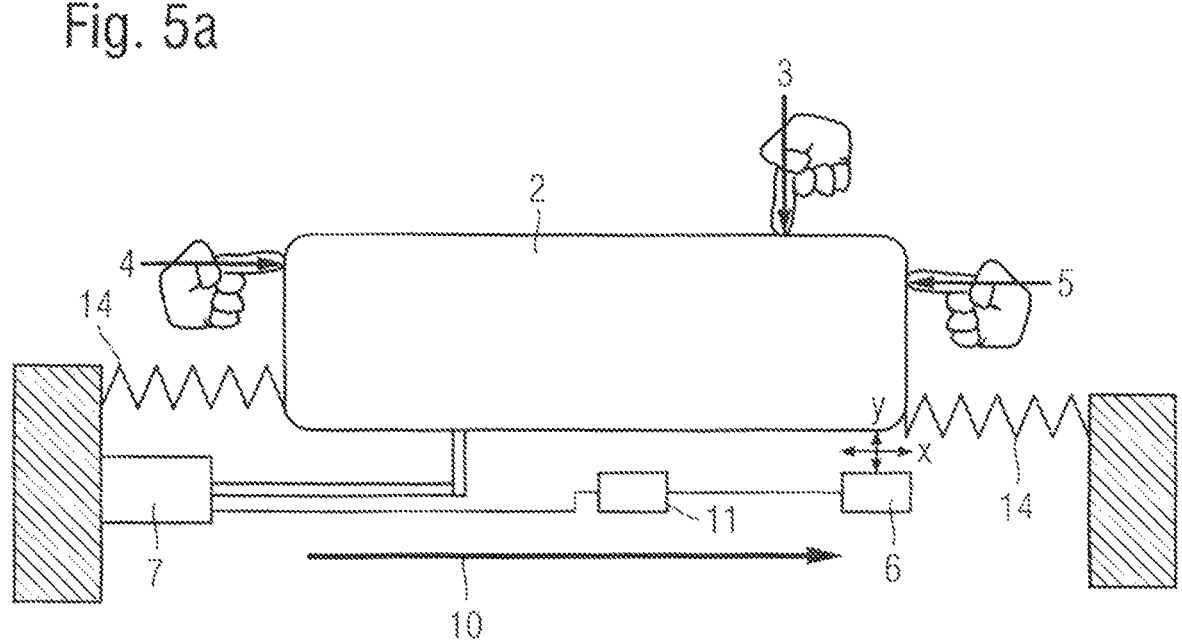
FIGS. 5a to 5c show a third embodiment of the operating member.
Figure 5C:
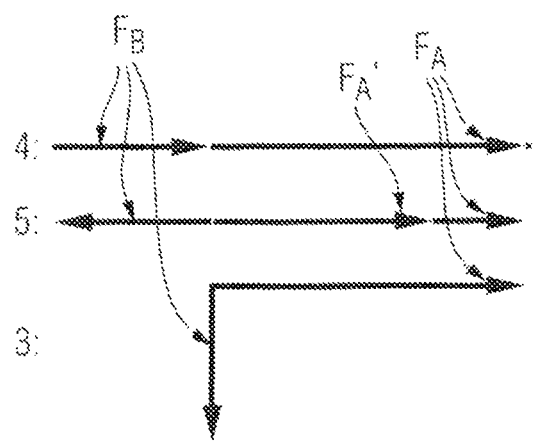

Another, second embodiment of the operating member is explained with reference to the FIGS. 5a to 5c. It comprises an actuating part 2, which is held by elastic restoring means 14 in a rest position in a restoring manner and which is driven by an electromotive or electromagnetic actuator 7 in the direction of the arrow 10 in order to generate a haptic feedback. The haptic feedback 10 is varied depending on an actuation, more specifically depending on the detectable actuating directions. The detectable actuating directions result from the resolution of the means for detecting 6 and their detection directions 3, 4, 5. In the present case, they are optically detecting means for detecting 6, for example, that detect the deflections X, Y of the actuating part 2 upon actuation from the rest position and resolve them with respect to the three detection directions 3, 4, 5. Depending on the extent of the actuation in the three detection directions 3, 4, 5, the specific electrical excitation signal for the actuator 7 is caused by the evaluation unit 11 during and after the actuation deflection of the actuating part 2 and varied depending on the dominating one of one of the three detection directions 3, 4, 5. The aim of this variation is to adapt the haptic feedback to the three actuations corresponding to the three detection directions 3, 4, 5. As FIG. 5*b* is supposed to illustrate, an adaptation is necessary already because an offset resulting from the deflection X affects the operating point of the electromotive actuator 7 and thus its resultant force excitation F.

Figure 5B:
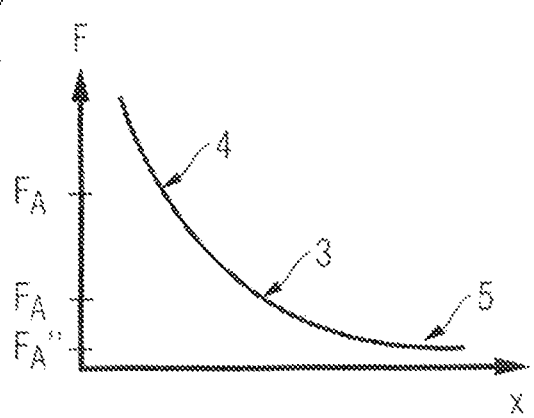

This is shown in FIG. 5*b* for the different actuations in the three detection directions 3, 4, 5. In order to adapt the haptic feedback, it is now provided that the evaluation unit 11 selects the excitation signal for the cases 4 and 5 of FIG. 5*c*, which correspond to the different actuations, in such a way that the operating point shift shown in FIG. 5*b* is at least partially compensated and that the haptic feedback represented by the arrows FA turns out at least approximately the same for the different cases. For case 4, for example, this means that the operating point shift of the actuator 7, which is caused by the actuation in the direction of the arrow 4 and which would as such involve a stronger haptic excitation FA", is varied in such a way that the haptic feedback is adapted to the case 3 due to the use of a specific electrical excitation signal that is weaker in comparison with case 3. In reverse, this applies, mutatis mutandis, for case 5, in which the reaction to a shift of the operating point and an associated attenuation of the haptic excitation according to the arrow FA' due to the actuation in the direction of the arrow 5 is a variation of the excitation signal by the evaluation unit 11 in such a way that a specific electrical excitation signal, which is stronger in comparison with case 3, is generated in order to cause an adaptation of the haptic feedback to case 3.

What is claimed is:

1. A device configured with an operator controlled element with haptic feedback, comprising:
   a base;
   an actuating part movably supported on the base;
   an electrical actuator attached to the base and connected to the actuating part, wherein the electrical actuator is configured to drive the actuating part in a predetermined excitation direction by means of an electrical excitation signal to generate a haptic feedback;
   a means for detecting an actuation of the actuating part in two detection directions, which in each case include a different angular amount with the excitation direction;
   an evaluation unit configured to drive the actuator with a specific electrical excitation signal based on the result relating to the two detection directions in which the actuation was carried out when an actuation in one of the two detection directions is detected, wherein the specific electrical excitation signal is selected by the evaluation unit to compensate for an operating point shift of the electrical actuator caused by the actuation of the actuating part, where the operating point shift is a relative shift between the actuating part and the base that corresponds to the actuation and is caused upon actuation, such that the specific electrical excitation signal produces harmonized haptic feedback that at least compensates for a deflection from a rest position caused by the operating point shift; and
   wherein the means for detecting further comprises a means for touch detection in order to detect a touch on the actuating part, and wherein the evaluation unit is further configured to vary the electrical excitation signal depending on the result of the touch detection.

2. The device of claim 1, wherein the electrical actuator is configured for linearly driving the actuating part.

3. The device of claim 1, wherein the evaluation unit is configured to drive the electrical actuator with another specific electrical excitation signal, when actuation in two detection directions is detected.

4. The device of claim 1, wherein the electrical actuator is any one of: an electromagnetic actuator or an electrodynamic actuator.

5. The device of claim 1, wherein the electrical excitation signal comprises a rectangular acceleration pulse and the specific electrical excitation signals vary solely with respect to a duty factor.

6. The device of claim 1, wherein the electrical excitation signal is a sequence consisting of an acceleration pulse and a braking pulse.

7. The device of claim 1, wherein the specific electrical excitation signals vary with regard to their maximum amplitude depending on the angular amounts.

8. The device of claim 1, wherein at the least two detection directions are either parallel or orthogonal to the excitation direction.

9. The device of claim 1, wherein the actuating part is a three-dimensional raised portion whose flanks define actuating surfaces.

10. The device of claim 9, wherein the excitation direction is parallel to a base surface of the actuating part facing away from an operator.

11. The device of claim 1, wherein the operator controlled element is a joystick with a pivotable or shiftable mounting of the actuating part.

12. The device of claim 1, wherein the device is operable in a motor vehicle.

13. A method for the generation of haptics in an operating member, comprising:
    detecting an actuation of an actuating part in one of two detection directions;
    generating a specific electrical excitation signal for an actuator when an actuation in one of the two detection directions is detected;
    exciting the actuator with a specific electrical excitation signal when an actuation in one of the detection directions is detected, wherein the specific electrical excitation signal is selected to compensate an operating point shift of the actuator caused by the actuation of the actuating part, where the operating point shift is a relative shift between the actuating part and a base that corresponds to the actuation and is caused upon actuation, such that the specific electrical excitation signal produces harmonized haptic feedback that at least compensates for a deflection from a rest position caused by the operating point shift; and
    wherein a touch on the actuating part is detected, and the specific electrical excitation signal is varied depending on the touch detection.

14. The method of claim 13, wherein another specific electrical excitation signal is generated after the detection of a simultaneous actuation in two detection directions.

15. The method of claim 13, wherein the actuator is configured for linearly driving the actuating part.

16. The method of claim 13, wherein the actuator is any one of: an electromagnetic actuator or an electrodynamic actuator.

17. The method of claim 13, wherein the electrical excitation signal in each case comprises a rectangular acceleration pulse and the specific electrical excitation signals vary solely with respect to a duty factor.

18. The method of claim 13, wherein the excitation signal is a sequence consisting solely of an acceleration pulse and a braking pulse.

* * * * *